United States Patent [19]
McCoy et al.

[11] 3,714,185
[45] Jan. 30, 1973

[54] PROCESS FOR THE PREPARATION OF 2-PYRROLIDONE
[75] Inventors: John J. McCoy, Boothwyn, Pa. 19061; Jin Sun Yoo, South Holland, Ill. 60473
[73] Assignee: Atlantic Richfield Company, New York, N.Y.
[22] Filed: Sept. 25, 1970
[21] Appl. No.: 75,793

[52] U.S. Cl. ..........................260/326.5 FN, 252/437
[51] Int. Cl. ...............................................C07d 27/08
[58] Field of Search...............................260/326.5 FN

[56] References Cited

FOREIGN PATENTS OR APPLICATIONS 1,028,097   5/1966   Great Britain...............260/326.5 FN Primary Examiner—Alex Mazel
Assistant Examiner—Joseph A. Narcavage
Attorney—Robert R. Cochran and Michael B. Fein

[57] ABSTRACT

The use of certain complexes of cobalt and rhodium containing phosphine either either unsupported or supported, as catalysts for the cyclo-carbonylation reaction.

7 Claims, No Drawings

PROCESS FOR THE PREPARATION OF 2-PYRROLIDONE

CROSS REFERENCE TO RELATED APPLICATIONS

This application is related to Ser. No. 32,411 filed Apr. 27, 1970 now pending.

BACKGROUND OF THE INVENTION

1. Field of the Invention

This invention relates to processes for joint carbonylation and cyclization of certain unsaturated compounds with a new transition metal phosphine ligand catalyst complex which is optionally supported.

2. Description of the Prior Art

Numerous catalysts have been suggested for the cyclo-carbonylation reaction. For instance, it has been suggested to catalize the cyclo-carbonylation of allylamine to 2-pyrrolidone with salts such as the halides, acetates and nitrates or carbonyls of cobalt, rhodium, nickel, palladium, iron, platinum and indium. Certain specific catalysts of the prior art where the cobalt carbonyls such as $Co_2(CO)_8$, rhodium carbonyls such as $[Rh(CO)_3]_n$ and nickel carbonyls such as $Ni(CO)_4$. These last mentioned catalysts were used successfully to cyclo-carbonylate allylamine in the liquid phase by Falbe, et al., Chem. Ber. 98, 1938 (1965), and Tet. Letters, 3677 (1965). However, the prior art reactions required high temperatures and high pressures of carbon monoxide, such as 300°Centigrade at 700 atmospheres. Further problems with the prior art processes were separation of the liquid catalyst from the liquid product.

SUMMARY OF THE INVENTION

It has been discovered that the transition metal phosphine ligand complexes defined by the formulas $$XRh(CO)_n(PR_3)_{3-n}$$

wherein $n$ is 0, 1 or 2; R is alkyl, aryl, alkaryl, substituted alkyl, aryl or alkaryl; X is Cl, Br, I or H; or $$[M(CO)_3PR_3]_q$$

wherein R is alkyl, aryl or substituted alkyl or aryl; M is Co or Rh and $q$ is at least 2; optionally on a solid acidic support, provide excellent catalytic activity for the cyclo-carbonylation reaction in general and further overcome the disadvantages of the prior art catalytic processes in that the process of the invention may be carried out at lower temperatures and pressures, and, furthermore, in its supported aspect, provides a "heterogeneous" catalyst system wherein the solid catalyst can be easily separated from the liquid product and can be efficiently reused.

It is, therefore, an object of this invention to provide a new and improved method for the reaction of carbon monoxide and compounds having at least one carbon-to-carbon unsaturation site and containing at least one other functional group.

It is a further object to provide a new method for the carbonylation of allylamines, allylamides, and allylalcohols to produce the corresponding lactams, imides and lactones respectively. It is a still further object to provide a heterogeneous catalyst system for the cyclo-carbonylation reaction of certain compounds.

A further object is to react allylamine and carbon monoxide at a lower temperature and pressure than achieved by the prior art with the attendant advantage of ease in catalyst recovery.

DETAILED DESCRIPTION OF THE INVENTION

These and other objects are accomplished by employing the following catalysts which have not heretofore been used in the cyclo-carbonylation reaction:

$XRh(CO)_n(PR_3)_{3-n}$     wherein $n$ = 0, 1 or 2;
R = alkyl, aryl, alkaryl, substituted alkyl, aryl or alkaryl;
X = Cl, Br, I or H;

or   $[M(CO)_3PR_3]_q$     wherein R = alkyl, aryl or substituted alkyl or aryl;
M = Co or Rh
$q$ = at least 2.

The preferred metal is rhodium, and the most preferred catalyst for the reaction is tris(triphenylphosphine)chloro-rhodium supported on silica-alumina microspheres, the microspheres having an average particle size of from 20 to 80 microns.

The solid support for the catalyst can be natural and synthetic silica, alumina, aluminasilicates, active carbon and others.

A highly preferred catalyst support can be made by combining a silica-alumina hydrogel with a hydrous alumina with or without (preferably without) a crystalline aluminosilicate. The mixture of the support precursor components can be dried, e.g., at about 105° to 260°C. to convert the silica-alumina hydrogel to xerogel form. The dried material can then be calcined, e.g., at a temperature of about 370° to 930°C., preferably about 425° to 760°C., to provide the active catalyst support. During calcination, the separate hydrous alumina phase of the mixture is converted to a gamma form or other catalytically active alumina.

On a dry basis, the preferred supports of the catalysts of the present invention contain about 45 to 95 weight per cent of the amorphous silica-alumina xerogel, about 5 to 55 weight per cent of the separately added alumina phase, and about 0 to 50 weight per cent of the crystalline aluminosilicate, preferably the proportions of these ingredients are about 75 to 90 per cent, about 10 to 25 per cent and about 0 to 20 per cent, respectively. If present, the crystalline aluminosilicate is usually at least about 1 weight per cent, preferably at least about 5 weight per cent, based on the dried support. The alumina content from the silica-alumina zerogel and the separate alumina phase is about 20 to 70 weight per cent, preferably about 25 to 60 weight per cent, based on the dried support. Also, the catalyst support generally contains less than about 1.5 weight per cent, preferably less than about 0.5 weight per cent, sodium.

In the preparation of the catalyst composition of the present invention the cobalt or rhodium metal source is provided by compounds of the metal which are at least slightly soluble in some solvent wherein metal phosphine ligand complex can be formed. Preferred are the weak field complexes, the ligands of which readily serve in solution as transfer agents. Suitable sources of the metal can include for example halides, dialkoxy cobalt, dialkoxy rhodium, dialkoxy cobalt carboxylate, diphosphine complexes, chelates formed by the cobalt or rhodium and weak field ligands such as β-diketones or β-ketodicarboxylic acid and esters and salt of dicarboxylic acids. Examples of these types of cobalt or rhodium sources include β-diketonato cobalt(II), β-diketonato rhodium(II), acetylacetonato cobalt (II), acetylacetonato rhodium(II), propylacetonate cobalt(II), propylacetonate rhodium(II), benzoylacetonato cobalt, benzoylacetonato rhodium, chelates from β-ketocarboxylic acid esters; salts of saturated monocarboxylic acids, e.g., cobalt formate, rhodium formate, cobalt propionate, rhodium propionate, cobalt caproate, rhodium caproate, cobalt octoate, rhodium octoate, cobalt palmitate, rhodium palmitate, cobalt stearate, rhodium stearate, cobalt phenylacetate, rhodium phenylacetate, cobalt phenylpropionate, rhodium phenylpropionate, and the like; salts of corresponding unsaturated monocarboxylic acids, e.g., cobalt acrylate, rhodium acrylate, cobalt vinyl acetate, rhodium vinyl acetate, and the like; salts of unsaturated dicarboxylic acids, e.g., cobalt adipate, rhodium adipate, cobalt decane-1,10-dicarboxylate, rhodium decane-1,10-dicarboxylate, and the like; salts of corresponding unsaturated dicarboxylic acids, e.g., cobalt muconate, rhodium muconate and the like; salts of cyclic and aromatic carboxylic acids, e.g., cobalt cyclohexane carboxylate, rhodium cyclohexane carboxylate, cobalt benzoate, rhodium benzoate, cobalt phthalates, rhodium phthalates, and the like; and dialkoxycarboxylates, e.g., cobalt dimethoxyacetate, rhodium dimethoxyacetate and the like. Preferred as the source of the cobalt or rhodium is the acetylacetonate, as for example, cobalt acetylacetonate.

The electron donor ligand component employed in preparing the metal complex component of the catalyst of the present invention is preferably a triorganophosphine corresponding to the general formula $R_3P$ wherein R is a hydrocarbon radical, e.g., alkyl, aryl, alkaryl, aralkyl and cycloalkyl of from one to about 20 carbon atoms, preferably two to about six carbon atoms; different R groups can, of course, be present in the same phosphine molecule. When the phosphine component contains aromatic groups it is generally preferred that these have mono-cyclic structures, e.g., that the groups be selected from phenyl, alkylphenyl, or phenylalkyl radicals.

Multifunctional phosphines such as bis(diphenylphosphino) ethane may be used in place of the foregoing described unidenate phosphines.

It is, however, preferred that triorganophosphines be utilized. Examples of suitable phosphines for the composition of the present invention are triphenylphosphine, trimethylphosphine, tricyclohexylphosphine, tri-n-hexylphosphine, tri-n-decylphosphine, tribenzylphosphine, tri-(4-n-butylphenyl)-phosphine, trieicosylphosphine, triesopropylphosphine, tri(t-butyl)-phosphine, di(t-butyl)isopropylphosphine, and the like.

The preparation of the heterogeneous supported catalyst is preferably conducted by first forming the complex of the phosphine ligand and the metal source. The metal source and ligand can be present in about the stoichiometric amounts necessary to form the complex or one component can be present in an excess amount of that necessary for the formation of the complex.

Formation of the ligand-metal complex can be effected by simply mixing the two reactants in the presence of a suitable solvent for the complexing reaction. The mixing may be done at room temperature or up to as high as about 150°C. The complex usually forms within about 20 to 40 minutes after mixing at elevated temperature. Suitable solvents for the complex-forming reaction include the same solvents which are suitable for use in the final catalyst composition. If desired, however, the complexing can be accomplished in a solvent which is unsuitable for use in the final composition; in this case the resultant complex will first be isolated from the reaction mixture and redissolved, or re-suspended, in a proper solvent or suspending agent which is inert to the final catalyst composition.

Thus, for example, one method of preparing a phosphine cobalt complex can involve stirring, preferably at room temperature, a mixture of tri-n-butylphosphine, cobalt acetyl-acetonate and chlorobenzene. In another method, the complex may be prepared by refluxing an alcohol, e.g., ethanol, solution of the phosphine, say tri-n-butylphosphine, and cobalt acetylacetonate, preferably at a temperature of about 65 to 120°C. and isolating the resultant complex from the reactant mixture. This approach is often preferred where the metal reagent contains some water of hydration, as the water will be removed from the complex when the latter is separated from the alcohol solvent.

In either case, the metal-triorgano phosphine complex can be dissolved in a suitable solvent, e.g., ethanol, methanol, benzene, chlorobenzene, or the like, and charged to a reactor. Carbon monoxide gas can then be introduced at a temperature of from about 150° to 195°C., and a pressure of from about 200 to 2,000 psig., preferably from about 600 to 1,500 psig. to obtain the metal-carbonyl-triorgano phosphine complex.

When the hydrodo-metal carbonyl complex is to be formed, premixed hydrogen and carbon monoxide in a molar ratio of 1:1 to 1:100 can be used instead of carbon monoxide alone. The solid support, in finely-divided form, is added to the complex in the solvent or suspending agent and the system is agitated for a time sufficient to affix the complex on the support.

The order in which components are combined to prepare the supported catalyst of the present invention can be varied. It can be conveniently prepared by impregnating the support material during the reductive carbonylation of metal phosphine ligand under carbon-monoxide, or by preparing the metal phosphine ligand in situ by mixing metal salt, e.g., cobalt naphthanate, tri-n-butylphosphine, and the support material in the presence of solvent and heating under an atmosphere of carbon-monoxide. In each case when the catalyst is prepared on the support, it is a solid heterogeneous catalyst which results. It is highly preferred to use the catalyst in its supported aspect because the catalyst is thereby more easily recovered and reused, and much more easily employed in a continuous process.

The solid supported catalyst can also be prepared in situ by charging the metal source, such as cobalt acetylacetonate or rhodium trichloride, the phosphine ligand, such as tri-butyl phosphine or triphenyl phosphine, and the support in finely divided form in a suitable solvent to an autoclave reactor and allowing these components to react under carbon monoxide at a pressure of from about 1,000 to 1,8000 psig., and a temperature of from about 150° to 195°C. for about one hour. Optionally, premixed hydrogen and carbon monoxide in a molar ratio of 1:1 to 1:100 can be used instead of carbon monoxide alone. The resulting supported catalyst system can be separated by removing the liquid phase from the reactor.

The solid supported catalyst system can also be prepared by dissolving the metal source such as cobalt naphthenate or cobalt acetylacetonate in a solvent such as benzene or alcohol. The solid support is added to the resulting pink solution and the system is agitated at room temperature overnight yielding a colorless supernatant liquid and pinkish-colored support particles. These cobalt-impregnated support particles are than filtered, washed and dried in an oven. The dried cobalt-impregnated particles are charged to a reactor along with an electron donor ligand, such as tributyl phosphine, in a solvent. The system is pressured with carbon monoxide under conditions as set forth above for in situ preparation and the cobalt carbonyltriorgano phosphine complex on a solid, acidic, silica-based support catalyst recovered. An olefin feed can be introduced with the carbon monoxide also in the manner set forth above for in situ preparation.

The catalyst systems of the invention are more stable than those of the prior art, probably due to the phosphine complex, and have greater life at high temperatures and pressures.

The homogeneous catalyst system of the invention is less preferred because of the difficulties in separation of the catalyst from the reaction mixture for subsequent reuse. The heterogeneous (supported) catalyst system is highly preferred for its ease in catalyst recovery and reuse aspects.

The unsaturated compounds suitable for the cyclocarbonylation reaction of the invention can be unsaturated alcohols such as allyl alcohol, β-methallyl alcohol, crotyl alcohol; unsaturated alicyclic alcohols such as 3-cyclohexenyl methanol; amides such as acrylamide, N-monosubstituted acrylamides wherein the substitution may be alkyl, aryl, chlorophenyl, dichlorophenyl, benzyl, allyl, N-substituted methacrylamide wherein the substitution may be alkyl or benzyl; amines such as N-monosubstituted allyl amines wherein the substituent is alkyl, benzyl, or alkenyl, such as N-vinyl allyl amine; acetates such as allyl acetate, allyl acrylate; Schiff's bases such as benzalaniline and substituted N-benzylidenanilines, Schiff's bases of aliphatic amines, naphthaldehydes; and azeobenzenes such as azobenzene and its derivatives. Further suitable compounds are those shown at Angew. Chem. I.E. 5, 485-532 (1966).

The reaction is carried out by introducing the unsaturated compound and carbon monoxide in the presence of the catalyst of the invention, an inert solvent under pressure of 20 to 340 atmospheres with a preferred range of 30 to 130 atmospheres, and the most preferred range being 60 to 100 atmospheres. Temperatures in the range of 120° to 290°C. are suitable with the preferred temperature for the allylamine cyclocarbonylation being 150° to 200°C. These temperatures and pressures are lower than any previously reported for this reaction. See British Pat. No. 628,529, Example 13, which showed a temperature of 300°C. at 700 atmospheres.

The carbonylation reaction can be carried out in the presence or absence of an inert solvent. Non-aqueous solvents useful in the reaction are benzene, substituted benzene, saturated or partially saturated cyclo compounds, aqueous-non-aqueous solvent mixtures can also be used, for example a benzene-water mixture. The preferred solvent is benzene. The cyclic carbonyl compounds produced by the process of this invention have known utility. For example, the product of the allylamine cyclo-carbonylation is 2-pyrrolidone which is useful as a precursor for nylon-4.

The following examples are merely illustrative of the preferred embodiments of the novel process of this invention and are not intended to be limiting.

EXAMPLE I

An alumina hydrogel is prepared as follows:

In a tank containing 5700 gallons of water at 30°C. are dissolved 300 lbs. of soda ash. When the soda ash has been dissolved, 180 gallons of a 39 percent concentration aqueous sodium aluminate solution are pumped into the tank at about 84°F. Six-hundred gallons of aqueous aluminum sulfate of 7.8 percent concentration, as $Al_2O_3$, are added to the admixture.

The pH of the resulting aqueous reaction mass is adjusted to 8.0 with about 75 gallons of 39 percent concentration aqueous sodium aluminate solution which, while being added, is also diluted continuously with water. The contents of the tank are heated to about 38°C and pumped to storage.

The precipitated, hydrated alumina is thereafter filtered on a large gel filter. The filtered product is partially purified by a water-wash. After washing, the wet alumina hydrogel analyzes about 50 percent boehmite having a crystallite size of about 35 A, and 50 percent amorphous hydrous alumina as determined by X-ray diffraction on dried samples.

EXAMPLE II

A silica-alumina hydrogel is prepared by the following technique:

To a batch tank is added 4,275 gallons of water preheated to 32°C., and 865 gallons of sodium silicate solution (28.8 weight per cent $SiO_2$, 40–41.5 Baume at 68°F. and $Na_2O:SiO_2$ ratio of 1:3.2) is added and stirred. The concentration of the sodium silicate, as $SiO_2$, in the batch is 6.3 weight per cent.

With the batch at 32°C., 302 gallons of 34.5 weight per cent sulfuric acid solution at 83°C. are added. The gel forms and then the pH is adjusted to 8.0—8.5. The batch is agitated for ten minutes.

Then 715 gallons of alum (7.8 weight per cent, as $Al_2O_3$) is added to the gel. The batch is agitated for an additional 5 minutes whereupon 205 gallons of sodium aluminate solution (24.4 weight per cent as $Al_2O_3$) diluted in 1080 gallons of water is added. The alumina content of the silica-alumina hydrogel is 30–31 percent.

EXAMPLE III

The silica-alumina hydrogel product of Example II and 1740 gallons of the alumina hydrogel filter cake of Example I are mixed together and blended to give a gel slurry of about 14 weight per cent solids. A portion of this hydrogel mixture was slurried to a thick flowable paste, to give a thorough dispersion, and dried in a spray-drier. The spray-dried material was washed with water and dried at 110°C. The washed and dried material analyzed 0.08% $SO_4$ and less than 25 ppm $Na_2O$. The dried material as such was used as the catalyst support, as were extruded forms thereof and tablets (pellets) having diameters of about one-eighth inch and lengths of about one-eighth to one-half inch. Before use the catalyst support was calcined in a muffle furnace by raising the temperature by 150°C. per hour until 730°C. was reached. This temperature was then held for 3 hours. The calcined particles had a surface area of about 320 to 340 square meters per gram.

EXAMPLE IV 15.0 grams of mixed silica alumina and alumina microsphere support material prepared in accordance with Example III were placed in a reaction vessel with 0.930 grams of tris(triphenylphosphine)chlororhodium, 11.4 grams of allylamine, and 150 cubic centimeters of benzene, and the materials were stirred under nitrogen and then under a pressure of 33 atmospheres of carbon monoxide. The CO pressure was then raised to 66 atmospheres and thereafter to 70 atmospheres with hydrogen at 22°C. The temperature was thereafter raised to 149°–151°C., increasing the pressure to 80 atmospheres. After 2 hours the pressure dropped to 66 atmospheres and the heating was stopped. The liquid product was distilled. Yielding 20 weight per cent pyrrolidone. The solid catalyst was filtered off, washed with benzene and dried.

EXAMPLE V 15.0 grams of the dried solid catalyst produced in Example III, 22.8 grams of allylamine and 100 cc. of benzene were heated to 100°–112°C. under CO pressure of 66 atmospheres. The pressure rose to 77 atmospheres. The temperature was raised to 149°–151°C. The CO pressure was maintained at 63–86 atmospheres for 12 hours and the liquid reaction product contained no allylamine, that is, 100 percent conversion, and yielded 26.6 weight per cent pyrrolidone.

EXAMPLE VI

A solid catalyst recovered from Example V was re-used in this example with 22.8 grams allylamine, 100 cc. of benzene, carbon monoxide pressure of 83 atmospheres, temperature of 177°–180°C. The pressure rose to 115 atmospheres and the reaction continued for 7 hours. With an allylamine conversion of 66.9 per cent, the pyrrolidone yield was 33.5 per cent.

EXAMPLE VII 20.0 grams of the microspheres of Example III were stirred with 1.02 grams of $ClRh(CO)[P(C_4H_9)_3]_2$ in 100 cc. of benzene. The reaction product was filtered and the solid was dried in vacuum and thereafter charged to a reaction vessel with 100 cc. of benzene and 22.8 grams of allylamine at a CO pressure of 66 atmospheres. The temperature was raised to 149°–152 °C. for 2½ hours. The yield of pyrrolidone was 4.01 per cent.

EXAMPLE VIII

A reaction vessel was charged with 0.69 grams of $[Co(CO)_3P(C_4H_9)_3]_2$, flushed with nitrogen and carbon monoxide, injected with 100 cubic centimeters of benzene, 30 cubic centimeters of allylamine (22.8 grams), carbon monoxide added to pressure of 66 atmospheres and heated to 149° C. for 1 hour. The temperature rose to 177° C. and pressure to 92 atmospheres. After 2½ hours, allylamine conversion was 66 per cent, pyrrolidone yield was 19 per cent.

EXAMPLE IX 15 grams of the Example III microspheres, 0.576 grams of $[Co(CO)_3P(C_4H_9)_3]_2$, 50 cubic centimeters of benzene, 22.8 grams allylamine, carbon monoxide to a pressure of 52 atmospheres, and hydrogen to a pressure of 53 atmospheres were all injected into a reaction vessel. Upon heating to 182° – 192°C., pressure rose to 83 atmospheres then dropped slowly. After 6 hours, CO was added to a pressure of 106 atmospheres. After 2 hours, heating was stopped and the reaction allowed to stand for 66 hours.

After 4 hours of heating at 188°–190°C. at 100 atmospheres carbon monoxide pressure, allylamine conversion was 92.7 per cent, pyrrolidone yield was 11.1 per cent.

EXAMPLE X

The catalyst of Example IX was recovered, and charged with 10 cubic centimeters benzene, 26.6 grams allylamine, carbon monoxide to 78 atmospheres, hydrogen to 82 atmospheres, heated 7 hours at 191°–193°C., then 24 hours at 118 atmospheres with resultant allylamine conversion of 86.2 per cent, pyrrolidone yield of 4.3 per cent.

Other modifications of the process may be made by those skilled in the art without departing from the spirit and scope of the invention.

We claim:

1. A process for producing 2-pyrrolidone comprising reacting allylamine with carbon monoxide at a pressure of from about 33 to 330 atmospheres and a temperature of from about 120° to about 290°C. in the presence of a catalyst of the formula

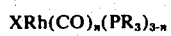

wherein $n$ = 0, 1 or 2;
R = alkyl [, aryl, alkaryl, substituted alkyl, aryl or alkaryl] of from 1 to 20 carbon atoms, phenyl, benzyl, n-butyl phenyl, or cyclohexyl;
X = Cl, Br, I or H;

or 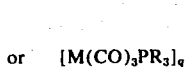

wherein R = alkyl [, aryl or substituted alkyl or aryl] of from 1 to 20 carbon atoms, phenyl, benzyl, n-butyl phenyl, or cyclohexyl;
M = Co or Rh
$q$ = at least 2.

2. The process of claim 1 wherein the catalyst is supported on artificial silica, alumina, aluminosilicates or active carbon.

3. The process of claim 1 wherein the catalyst is tris(triphenylphosphine) chlororhodium supported on silica-alumina xerogel microspheres having an average particle size of from 20 to 80 microns.

4. A process of claim 1 wherein the pressure is from about 66 to about 130 atmospheres and the temperature is from about 150° to about 200°C.

5. The process of claim 1 carried out in the presence of an inert solvent.

6. The process of claim 4 wherein the solvent is benzene.

7. A process for producing 2-pyrrolidone comprising reacting allylamine with carbon monoxide at a pressure of from about 60 to about 100 atmospheres and a temperature of from about 150° to 200°C. in the presence of tris (triphenylphosphine) chlororhodium supported on silica-alumina microspheres having an average particle size of from about 20 to 80 microns.

* * * * *